March 24, 1942.   F. PORSCHE   2,277,454
FLUID OPERATED CONTROL APPARATUS FOR CLUTCHES
Filed Aug. 3, 1938
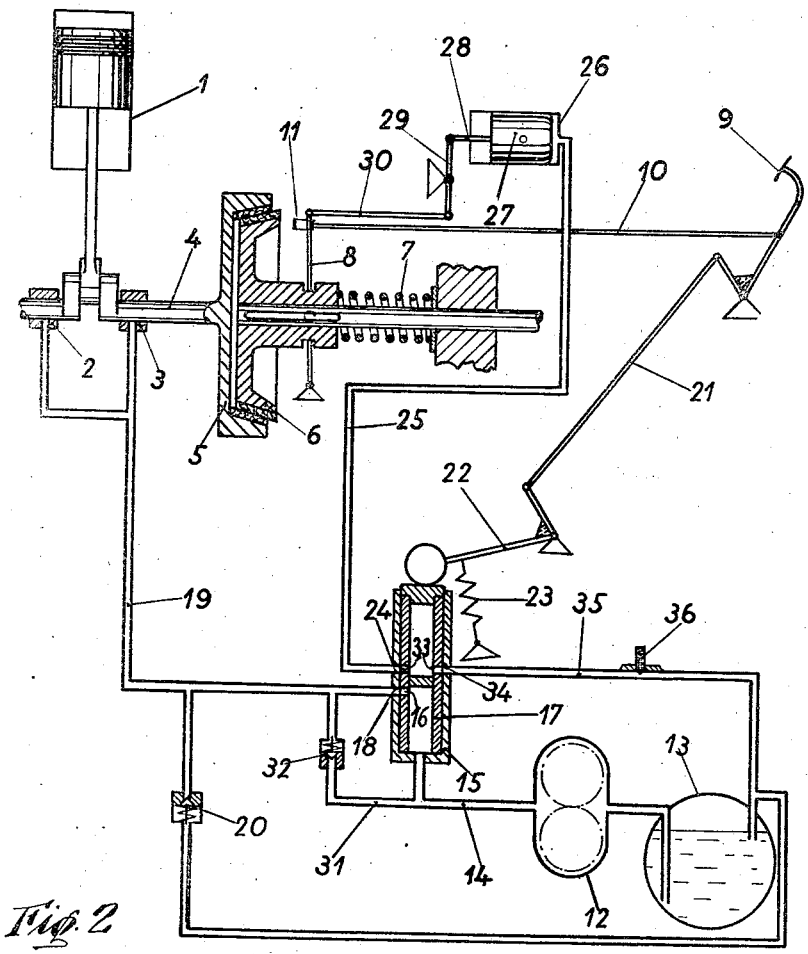
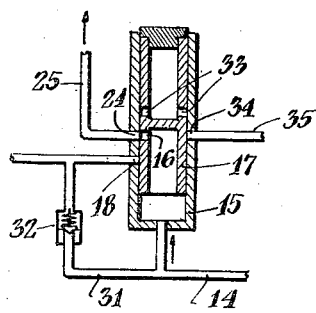
Inventor
FERDINAND PORSCHE
By
Attorneys Patented Mar. 24, 1942

2,277,454

UNITED STATES PATENT OFFICE 2,277,454

FLUID OPERATED CONTROL APPARATUS FOR CLUTCHES

Ferdinand Porsche, Stuttgart-on-the-Neckar, Germany, assignor to Dr. Ing. h. c. F. Porsche, K.-G., Stuttgart-Zuffenhausen, Germany, a company of Germany Application August 3, 1938, Serial No. 222,902
In Germany August 10, 1937

9 Claims. (Cl. 192—91)

This invention relates to fluid operated control apparatus for clutches, and has for an object to provide such an apparatus in which a fluid under pressure serves under control of the operator to disengage or engage the clutch of a prime mover such as an internal combustion engine, particularly in motor vehicles.

Another object of the invention is to provide such an apparatus in which the usual lubricant pump of the prime mover supplies the operating fluid for an operating apparatus for the clutch controlling the power generated by said prime mover.

Another object is to provide such an apparatus in which the lubricant pump normally supplies lubricant under low pressure to the bearings of said prime mover (or other bearings of said vehicle), and in which means are provided for causing said pump to deliver lubricant at a higher pressure for operating said apparatus.

Another object is to provide for the release of fluid which has been delivered to said apparatus to a lubricant supply container preferably through an adjustable throttling device.

Another object is to provide control valve means actuated by the operator which normally permits direct delivery of lubricant from the pump to the bearings, and which in another position cuts off such direct flow so that delivery of oil to said bearings occurs through a relief valve so that a higher pressure of lubricant between the pump and the relief valve is made available for actuating said clutch operating apparatus.

Another object is to provide such a control valve which, when operated, interrupts the direct delivery of oil to said bearings and opens a passage for the delivery of oil from said pump to said apparatus.

Another object is to provide such a valve so constructed and arranged that the pressure of the lubricant assists in the operation of the valve toward the position in which lubricant is supplied to said apparatus.

Further objects and advantages of this invention will be apparent from consideration of the specification as illustrated by the accompanying drawing of possible embodiments of the invention, in which drawing:

Fig. 1 is a longitudinal cross-sectional view illustrating more or less schematically an illustrative form of the invention; and Fig. 2 is a fragmentary view of the valve mechanism and its connecting conduits, the valve slide being shown moved to a position in which fluid may be delivered to the clutch disengaging apparatus.

In said drawing, the numeral 1 represents the motor. 2 and 3 are lubricating points. 4 is the crank shaft with the flywheel 5. The latter is shown as provided with one member of a cone clutch, the other member of which is the clutch plate 6. 7 indicates the usual clutch spring, 8 the disengaging lever which is connected with the clutch pedal 9 through the linkage 10 and the idle movement connection 11.

The provision of the bearings 2 and 3 with oil is accomplished through the conduits 14 and 19 by any suitable pump, preferably of the positive displacement type such as the gear pump 12 drawing out of the oil container 13. 15 represents the control valve housing. The oil may flow at times through the slot 16 of the control slide 17 and the channel 18 leading to the distributing conduit 19. A pressure relief valve 20 serves in known manner for controlling the pressure necessary for lubrication by permitting some of the oil to return to the sump 13 when the pressure reaches the amount for which the valve has been set. From the clutch lever or pedal 9 a link 21 leads to the lever 22 which presses upon the valve 17 under action of the spring 23. In the control valve housing another channel 24 is provided from which a conduit 25 leads to the clutch disengaging cylinder 26 in which the clutch disengaging piston 27 is located and which operates clutch operating lever 8 as through the linkage members 28, 29, and 30. A conduit 31 branches off from the conduit 14 and connects with the oil distributing conduit 19 through relief valve 32, which valve is adjusted for the pressure necessary for operating the piston 27. The upper part of the control slide is provided with slits 33 which in the engaged clutch position (Fig. 1) connects the passage 24 through passage 34 with the conduit 35 leading to the oil container 13 through an adjustable throttle element 36.

The operation of the arrangement is, starting with the motor stationary, first, that upon starting the motor the clutch foot pedal 9 is pressed down so far that the connection 11 of the link 10 moves the disengaging lever 8 and thereby disengages the clutch 5, 6 against the operation of the spring 7. The motor may now be started in known manner. Thereupon, the gear pump 12 begins to deliver oil into the conduit 14, into the valve housing 15, through slit 16 and through the passage 18 into the distributing conduit 19 from which the lubricating points 2 and 3 are supplied with oil. The oil pressure, however, also lifts the control valve slide 17 upwardly so that shortly thereafter the channel 18 is closed. Thereupon the oil pressure rises so that the relief valve 32 is opened and oil again flows to the lubricating points 2 and 3, the oil being delivered at the proper pressure necessary for lubrication in accordance with the setting of the pressure relief valve 20. The slide valve is quickly raised further (to the position shown in Fig. 2), until pressure oil flows through the slit 16, the passage 24, the conduit 25, and to the cylinder 26, driving the clutch disengaging piston outwardly and relieving the stress upon the operating rods 10 and 11 through the linkage 28, 29, and 30, so that the clutch pedal 9 may be held down by the chauffeur without substantial stress. The reengagement of the clutch is effected by simply releasing the clutch pedal 9 so that the spring 23 presses the slide valve 17 downwardly by means of the lever 22 until the channel 24 is connected with the conduit 25 through the slits 33 and the passage 34 connecting with the conduit 25, so that the oil may flow back from the clutch disengaging cylinder 26 through the conduit 25, conduit 35, and throttle 36 to the sump 13, whereupon the clutch spring 7 moves the clutch plate 6 into effective position. The throttle valve 36 limits the speed of return of the oil so that the engagement is smooth and shock free. At the same time, the parts return to the position shown in Fig. 1 so that the distributing conduit 19 is again connected with the valve housing 15 through passage 18 and the slit 16. When the vehicle is in operation (motor running and clutch engaged) the parts are in the position shown in Fig. 1 so that the device is ready for service, whereupon the operation of the clutch may be effected repeatedly without tiring the operator.

Devices made in accordance with the invention are particularly useful in connection with centrifugal clutches, in which centrifugal masses serve to increase the clutch parts engaging forces in accordance with the speed of revolution because such clutches are especially difficult to disengage under certain circumstances.

An important feature of the invention is the means whereby operating fluid under high pressure is provided for operating the hydraulic clutch operating device. This permits of a much smaller cylinder and piston (or their equivalent) than when a vacuum device is used and also much smaller than when the lubricating oil at usual pressure is used. It is particularly desirable to provide means whereby a single source of pressure, as the usual lubricating pump, may deliver fluid at two different pressures, one for the points to be lubricated and a higher pressure for actuating the operating device, which may, as a result be made very small and light.

The application of the device is not limited to motor vehicles but is useful in case of ships and locomotives, or in any other apparatus in which a power unit is to be disconnected.

The construction of the pump is quite immaterial, it being possible to use pumps of other types, such as piston pumps. It is further immaterial which, if any, lubricant points are to be supplied by the pump so that, for example, a separate pump may be provided for operating the clutch.

Furthermore, the particular construction of the control valve is unimportant as well as that of its housing and the type of operating means for the control valve. It is only important that the hydraulic device be so arranged that a device such as a clutch of known or suitable type may be easily operated by fluid means with the minimum of mechanism and weight.

It will be noted that the construction shown and describe will serve admirably to accomplish the objects stated above. It is to be understood, however, that the construction disclosed above is intended merely as illustrative of the invention and not as limiting as various modifications therein may be made without departing from the invention as defined by a proper interpretation of the claims which follow.

I claim:

1. In a device for operating clutches and the like, the combination of a prime mover, a clutch for controlling power delivered thereby, a pump for forcing lubricant to the bearings of said prime mover, a hydraulic clutch operating device adapted for operation by lubricant from said pump, manual means for operating said clutch, a control valve, and means operated by said manual means for controlling actuation of said control valve from a position in which said hydraulic device is ineffective to a position in which lubricant is supplied for actuating said hydraulic operating device, the movement of said valve in a direction to actuate said hydraulic operating device being effected by the pressure of said lubricant.

2. In a device for operating clutches and the like, the combination of a source of fluid pressure, a hydraulic operating device adapted for operation by fluid from said source, manual means for operating said clutch through a lost motion connection, a control valve, and means for controlling actuation of said control valve operated by said manual means, the said control valve being moved by the pressure of said fluid in a direction to permit flow of fluid from said source to said hydraulic operating device.

3. In a device for operating clutches and the like, the combination of a prime mover, a clutch for controlling power delivered thereby, a pump for forcing lubricant to the bearings of said prime mover, a hydraulic operating device adapted for operation by the lubricant from said pump and for operating said clutch, a control valve, means for controlling actuation of said control valve from a position in which said hydraulic device is ineffective to a position in which lubricant is supplied for actuating said hydraulic operating device, said valve being so constructed as to normally cause lubricant at normal pressure to be delivered to said bearings and when moved from said normal position to first cut off the direct supply of lubricant to said bearings, and a relief valve connected between said pump and said bearings through which the lubricant is thereupon delivered to said bearings while lubricant at higher pressure is delivered to said operating means.

4. In a device for operating clutches and the like, the combination of a prime mover, a clutch for controlling power delivered thereby, a pump for forcing lubricant to the bearings of said prime mover, a hydraulic operating device adapted for operation by lubricant from said pump, manual means for operating said clutch, a control valve movable from a position in which said hydraulic device is ineffective to a position in which lubricant is supplied for actuating said hydraulic operating device, the movement of said valve in one direction being effected by the pressure of said lubricant, together with spring means whereby said valve is biased against movement by the oil pressure, and means actuated by said manual means for overcoming the effect of said spring means.

5. In a power transmission system of the class wherein a prime mover having a plurality of bearing points is adapted to supply power to a load through a normally engaged clutch, the combination of a pump adapted to supply lubricant under pressure, a pressure responsive device connected for disengaging said clutch, means including a valve for controlling the path of the supply of lubricant under pressure to said bearing points and said pressure responsive device, and a lever for controlling said valve and for mechanically disengaging said clutch.

6. The combination according to claim 5, in which said valve includes a slide movable between two extreme positions, in one of which it effects a flow of lubricant under pressure to said bearings, and in the other of which it permits a flow of lubricant under pressure to said pressure responsive device.

7. The combination according to claim 5, in combination with a lost-motion device between said lever and said clutch for permitting control of said valve before disengagement of said clutch.

8. In a power transmission system of the class wherein a prime mover having a plurality of bearing points is adapted to supply power to a load through a normally engaged clutch, the combination of a sump adapted to contain a lubricant, a pump adapted to supply lubricant under pressure from said sump, a pressure responsive device connected for disengaging said clutch, means including a valve for controlling the path of the supply of lubricant under pressure to said bearing points and to said pressure responsive device, a conduit interconnecting said valve with said sump, and a lever for controlling said valve and for mechanically disengaging said clutch, said valve having a slide movable between two extreme positions, in one of which it effects a flow of lubricant under pressure to said bearing points while connecting said pressure responsive device through said conduit to said sump, and in the other of which it permits a flow of lubricant under pressure to said pressure responsive device.

9. The combination according to claim 8, in combination with a throttling device in said conduit for insuring a slow engagement of said clutch when said slide is in the one extreme position.

FERDINAND PORSCHE.